United States Patent
Wachinski et al.

(10) Patent No.: US 6,294,057 B1
(45) Date of Patent: Sep. 25, 2001

(54) ENHANCED POLYMER ACTIVATION SYSTEM AND APPARATUS

(75) Inventors: Anthony M. Wachinski, The Woodlands, TX (US); Dylan J. Freeman, Brighton (GB)

(73) Assignee: Thames Water Utilities (GB)

( * ) Notice: Subject to any disclaimer, the term of this patent is extended or adjusted under 35 U.S.C. 154(b) by 0 days.

(21) Appl. No.: 09/028,786

(22) Filed: Feb. 24, 1998

(51) Int. Cl.[7] ............................................................ H05F 3/00
(52) U.S. Cl. ...................................................................... 204/165
(58) Field of Search ........................................ 204/155, 156, 204/157.4, 164

(56) References Cited

U.S. PATENT DOCUMENTS

| 3,220,873 | * | 11/1965 | Wesley | 117/93.1 |
|---|---|---|---|---|
| 4,458,153 | * | 7/1984 | Wesley | 250/435 |
| 4,747,691 | | 5/1988 | Hoffland | 366/160 |
| 4,917,785 | | 4/1990 | Juvan | 204/164 |
| 4,957,606 | | 9/1990 | Juvan | 204/164 |
| 5,026,484 | * | 6/1991 | Juvan | 210/717 |
| 5,112,934 | * | 5/1992 | Kester | 528/99 |
| 5,164,429 | | 11/1992 | Brazelton et al. | 523/322 |
| 5,252,635 | * | 10/1993 | Brazelton | 523/313 |
| 5,284,627 | | 2/1994 | Brazelton et al. | 422/135 |
| 5,338,779 | | 8/1994 | Brazelton | 523/313 |
| 5,372,421 | | 12/1994 | Pardikes | 366/137 |
| 5,904,855 | * | 5/1999 | Manz | 210/709 |

FOREIGN PATENT DOCUMENTS

| 0761726 | 12/1997 | (EP) . |
|---|---|---|
| 2170207 A | 7/1986 | (GB) . |
| 2248192 A | 1/1992 | (GB) . |
| WO 93/16572 | 8/1993 | (WO) . |
| WO 94/16809 | 8/1994 | (WO) . |

OTHER PUBLICATIONS

*Sludge Dewatering*, Bien, Kempa & Bien, "Influence of Ultrasonic Field on Structure and Parameters of Sewage Sludge for Dewatering Process" Madison Symmetric Torus (MST) (http://sprott.physics.wisc.edu/mst.htm, Mar. 26, 1997).

Chauhan, Muralidhara & Kim, "Electroacoustic Dewatering Process for POTW's" No date available.

Sparktec Environmental, Inc. brochure "Submersible Assembly" No date available.

Komax Systems, Inc. brochure "Polymaster™ ET" No date available.

Stranco brochure "Polyblend®" No date available.

*Chemicals Used for Dewatering*, "Polymer" No date available.

* cited by examiner

*Primary Examiner*—Kathryn Gorgos
*Assistant Examiner*—J. Maisano
(74) *Attorney, Agent, or Firm*—Niro, Scavone, Haller & Niro

(57) ABSTRACT

The present invention concerns a device and method for activating and/or increasing the charge density of a polymer or polymer solution. Included is a reactor having a chamber capable of receiving and discharging polymer or polymer solution. The chamber may be configured in a vertical orientation. The chamber may also be torus or doughnut-shaped. A pulsar for imparting electrical energy to the solution in the reactor chamber is also provided. An inlet and an outlet which cooperate with the chamber to deliver and discharge the polymer solution may also be provided. The inlet may be located on the bottom of the chamber and the outlet may be located on the top of the chamber.

18 Claims, 3 Drawing Sheets

ENHANCED POLYMER ACTIVATION SYSTEM AND APPARATUS

BACKGROUND OF THE INVENTION

The present invention relates to enhanced inversion, dispersion and activation systems and devices. More particularly, the present invention relates to enhanced organic polyelectrolytes (polymers) and organic polyelectrolyte solution inversion, dispersion and activation using electrohydraulic discharge energy delivered into the polymer or polymer solution. The present invention is applicable to situations in which an organic chemical, polymer or enzyme must be disentangled or uncoiled to obtain optimum performance. As a result, less polymer and less energy in activating the polymer are used when the polymer or polymer solution is optimally activated, reducing costs and improving efficiency.

Polymers have been widely used in sludge (biosolid) conditioning applications, such as dewatering applications where fine solid particles are removed from biosolids. Polymers are also used extensively in water treatment, wastewater treatment and industrial water treatment. They are also widely used in the food and chemical industries.

In general, polymers are organic macro-molecules composed as chains of five or more individual monomer building blocks linked together in a linear or branched configuration. Various functional groups may be located along the chain. Such functional groups provide charged sites which may be used to neutralize electrical charges on colloidal particles. The functional groups along the chain may possess a negative charge (anionic polymer), positive charge (cationic polymer), or an overall neutral charge (nonionic polymer).

Polymers are typically available in dry form, liquid solutions, and inverse emulsions. These "neat" preparations are diluted in water, mixed into solution and activated by an inversion process of mixing and aging to achieve increased activity. The purpose of the activation process is to allow the coils of the polymer to loosen and unwind, increasing the exposure of the functional charge sites to increase the effectiveness and performance of the polymer. During the aging process, the diluted polymer solution is allowed to sit in a tank with gentle or no stirring. In sludge dewatering applications, for example, when a polymer is optimally activated by exposing more of its functional groups, less polymer is required and higher cake solids are obtained. This results in lower operational cost and better performance.

For ease of understanding, the present invention, as well as most of the background of the invention, will be discussed by reference to the dewatering of biosolids. It will be understood, however, that the inventions may be employed in a wide variety of applications and technologies, including but not limited to water, wastewater and industrial water treatment as well as in the food, chemical and petrochemical industries.

In the past, and in most current biosolid dewatering applications, activation of polymers is accomplished by equipment specified by design engineers. In many instances, specific polymer preparation requirements are not met because of misinformation or misunderstanding between equipment designers, consultants and contractors. These facilities usually include pumps and calibration devices which allow a specified dilution of the polymer and water. This solution is then transferred to a mixing and aging tank where the polymer solution is activated. Polymer mixing and aging facilities are not usually designed to accommodate any particular type of polymer. FIGS. 1A and 1B schematically show a variety of systems typically used to activate polymer. These methods require, among other things, expensive equipment with high maintenance costs. Moreover, optimizing the equipment for a particular polymer is usually difficult and requires expensive modifications as well as constant attention and adjustment. Thus, in most cases, polymer activation is not optimal.

In biosolid dewatering applications, for example, it is first necessary to determine the type and amount of polymer to achieve the required conditioning, making it necessary to calculate such parameters as the solution strength, usage and feed rate for each operation (see e.g., *Chemicals Used for Dewatering*, Ch. 13, pp. 254–57). In such applications, water-soluable polymers are typically used, such as: methyl cellulose, carboxyl methyl cellulose and cellulose ethers; starches (ethers and acetates); polyvinyl alcohol (PVA), ethylene oxide polymers, polyvinyl pyrollidione, polyethyleneimine; as well as others. The dewatering calculations are complicated because of the continually changing composition of the biosolids and the fact that polymers in solution are only active and effective for certain finite periods of time. In practice, once the solution strength, usage and feed rates are calculated, the values are sometimes doubled to provide for a margin of error. This necessarily results in increased polymer usage and energy costs.

Static, in-line mixing technology to mix and activate polymers has been studied. The technology is appropriate for certain polymers only and suffers from, among other things, clogging problems. In the early 1980s, for example, in-line blending systems were developed that led to enhanced polymer activation. These systems are still in use today, particularly in the biosolid dewatering field; for example, to activate polymer solutions prior to or after being mixed with the biosolids to be treated. In many instances, these systems actually cause decreased performance in polymer activation because no means for aging the polymer is provided and/or the fragile polymer is over-mixed.

One such currently available method and apparatus is described in U.S. Pat. No. 5,164,429 to Brazelton et al., which is typical of the present state of polymer activation. In this type of system, polymers are activated by some form of rotating mixing mechanism to impart mechanical energy into the polymer solution and cause activation of the charge sites. Polymers are mixed in their diluted solution and further activated by mixing in separate and distinct zones of the mechanisms. Other systems use in-line mixing devices, or a combination of the two.

The claims of these devices is that the polymer solution is activated sooner than if the solution were traditionally mixed and allowed to age. However, none of the systems are able to change the physical or chemical characteristics of the polymer solution needed for activation. Another presently popular in-line mixer-type of system is available as the Polymaster of Komax Systems, Inc., Wilmington, Calif. Still other examples of polymer dilution/activation systems and devices are described in U.S. Pat. Nos. 5,284,627 and 5,252,635, both to Brazelton, et al.

A novel technology still in its infancy is the use of pulsed-plasma discharges ("pulsed power") in aqueous solutions to treat water and wastewater. High energy underwater discharges can induce a number of physical and chemical effects on solids and chemical compounds dissolved and suspended in water. Depending upon the energy of the pulse and the frequency of the pulses, these effects include the formation of high temperature, high pressure plasma, shock waves and electromagnetic radiation, including UV and X-rays.

Pulsed power technology, as currently employed, generally employs high frequency pulses (generally greater than one pulse per second) of electrical energy, typically of a millisecond's duration, to solids or organisms in a liquid which is between two electrodes. The pulsed power technology currently employed also typically require relatively high energy level pulses (of approximately 1,500 joules/second). One of the earlier devices for generating pulsed power, commonly referred to as a pulsar, is shown and described in U.S. Pat. No. 3,220,873 to R. H. Wesley, for applications such as the removal of constituents from solutions as precipitates and impregnation of surfaces with desired substances.

Some, including R. H. Wesley, have attempted to apply pulsed power technology directly to the treatment of wastewater. For example, U.S. Pat. No. 4,458,153, issued to R. H. Wesley, teaches the application of pulse power techniques, including electromagnetic fields, to directly treat wastewater to kill any microorganisms contained therein.

Others have also attempted to apply pulsed power technology to wastewater precipitation and treatment. A series of related patents, U.S. Pat. Nos. 4,917,785, 4,957,606 and 5,026,484, all issued to Christian H. A. Juvan, generally deal with the separation and/or precipitation of solids contained in a liquid through the use of high energy electrical discharge pulses.

High frequency, high energy pulsed power technology for the use in the dewatering of sludge and treatment of wastewater has also been attempted. Some have tried to apply pulsed power techniques to the treatment of the wastewater/sludge alone, without the subsequent use of polymers in the liquid. Others have attempted to first apply pulsed power to the wastewater and then add polymers activated in the standard manner for dewatering after pulsing the biosolid solution. These attempts have largely been unsuccessful due to high energy uses, inadequate system design and poor performance. There are no known attempts to apply pulsed power technology (and particularly low frequency/low energy pulsed power technology) to polymer activation, either before or after the polymer solution is added to the liquid to be treated.

SUMMARY OF THE INVENTION

The present invention preserves the advantages of prior methods and apparatus for the inversion, dispersion and activation of polyelectrolytes. In addition, the present invention provides new features and advantages, and overcomes the problems associated with known systems and devices.

Therefore, an object of the present invention is to provide improved systems and apparatus for the enhanced inversion, dispersion and activation of polyelectrolytes.

Another object of the present invention is to provide enhanced polymer activation with lower material, labor and energy costs.

An additional object of the present invention is to provide enhanced activation through the use of pulsed power electrical discharge.

A further object of the present invention is to provide improved methods and devices for polymer activation by changing the physical or chemical characteristics of the polymer using pulsed power electrical discharges.

Yet another object of the present invention is to provide an improved reactor that effectively and efficiently enables activation of the polymer or polymer solution through the use of electrical pulsed discharges.

Yet an additional object of the present invention is to provide systems and devices for changing the charge density of a polymer or a polymer in solution using low frequency, low energy pulsed power electrical discharges.

Still another object of the present invention is to provide an improved reactor where shockwave propagation is confined and attenuation of the electrical shockwaves reduced.

Yet a further object of the present invention is to reduce or eliminate the steps of mixing and aging the polymer solution while achieving optimum polymer activation.

Still another object of the present invention is to effectively and efficiently activate polymer solution before or after the polymer solution is added to the biosolid or other liquid to be treated.

And still a further object of the present invention is to provide an improved reactor that enables the use of low frequency, low energy pulses to enhance optimum mixing and activation of polymers or polymer solutions.

In accordance with the objects, features and advantages of the present inventions, methods and devices for, among other things, increasing the charge density of polymers and optimizing their activation, in batch or continuous processes, are provided. Such systems include the steps of mixing the polymer with water or another liquid to form a solution and transferring the polymer solution to a reactor. Once transferred to the reactor, the polymer solution is subjected to electrical and/or electromagnetic pulses and/or oscillations to effectuate inversion, dispersion and activation. Upon activation, the activated polymer solution is discharged from the reactor for further use. In accordance with the present invention, the systems also include the mixing of the polymer solution with sludge, wastewater or other liquid to be treated. This solution is then transferred to a reactor, where it is subjected to electrical pulses and then discharged. Also in accordance with the present invention, an improved reactor for holding the polymer solution for pulsing is provided. One such reactor is a doughnut-shaped or torus reactor which, in its preferred form, accepts the polymer solution at its bottom and solution is pumped or otherwise discharged from the top of the reactor. The polymer may also be mixed in the reactor.

BRIEF DESCRIPTION OF THE DRAWINGS

These and other features, objects, advantages and embodiments of the present inventions will become apparent with reference to the accompanying description and drawings, wherein like reference numerals represent like elements, and in which.

DETAILED DESCRIPTION OF THE PREFERRED EMBODIMENT

Figure 1A:
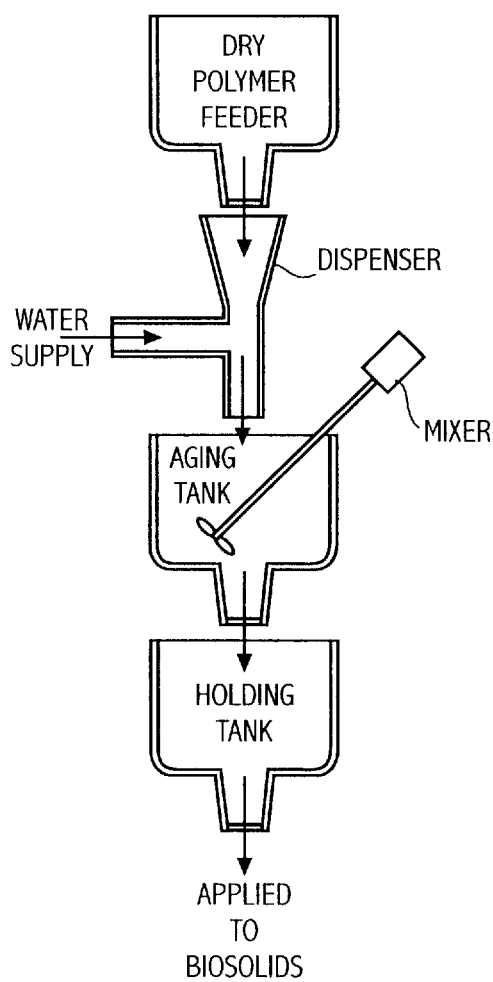
FIG. 1A is a schematic drawing of a typical system used to activate polymer solutions as may be found in the process for dewatering biosolids.
Figure 1B:
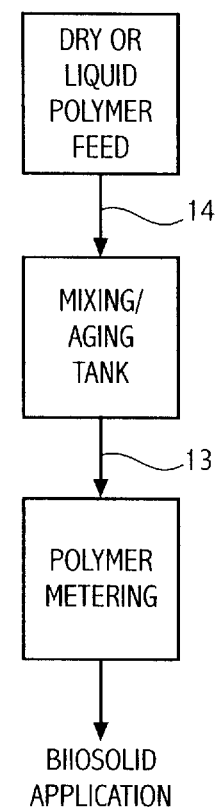
FIG. 1B is a schematic drawing of a typical system used to activate polymer solutions as may be found in the process for dewatering biosolids, with points "A" and "B" marked at those points in the system where the present invention may be employed.

The batch or continuous polymer activation systems of the present invention consist of three principal steps; namely, delivering a polymer solution to a reactor, subjecting the solution to electrical or electromagnetic pulses in the reactor and discharging the activated solution for use. Alternatively, the polymer may be mixed in the reactor and the mixing step eliminated, such as if the present invention were incorporated at point B of FIG. 1B. Similarly, devices of the present invention consist of two basic components; namely, a pulsar and a reactor.

Figure 2:
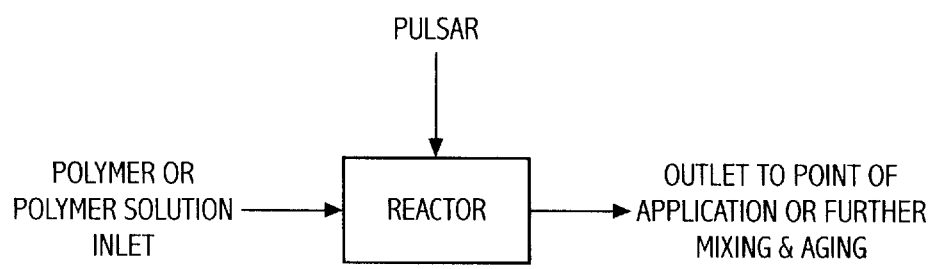
FIG. 2 is a schematic drawing of the method of polymer activation of the present invention.

A batch or continuous method of the present invention for activating polyelectrolyte solutions is schematically shown in its broader aspects in FIG. 2. First, the polyelectrolyte or polymer solution is delivered to the reactor. Once in the reactor chamber, the solution is subjected to electrical pulses of sufficient frequency and duration to sufficiently increase the charge density of the polyelectrolyte so that it is optimally activated for its particular application. Once activated, the solution is then discharged or extracted from the reactor for mixing, aging and/or application.

In general, a pulsar as used herein is an electronic device that is capable of imparting pulses of electrical or electromagnetic energy to a solution. The electrical pulses or oscillations induce physical and chemical effects on the properties of the polymer.

In general, a reactor of the present invention provides the location at which the polyelectrolyte solution may be subjected to the electrical energy of the pulsar. The vessel or chamber of the reactor may be constructed from essentially any material, as long as the material will not react with or otherwise contaminate the particular solution for which it is used, and is also able to withstand the forces generated by the electrical discharge. The capacity or size of the reactor used is dictated by the volume of solution to be treated and the charge density requirements of the particular application. Similarly, the shape of the reactor vessel or chamber may be any cross-sectional shape, such as spherical, ellipsoidal or circular, consistent with the flow and charge density requirements of activation. Moreover, a reactor of the present invention may accept, activate and/or mix the polymer solution on either a continuous or instantaneous basis.

In accordance with the present invention, a variety of available pulsars may be used to impart the electrical energy to the polymer solution. Typically, pulsars are manufactured to suit the demands of the particular application as specified by the system designer. One manufacturer of acceptable pulsars is Pulsed Power Technology, Inc. of Spring Valley, Calif. (see also U.S. Pat. No. 4,458,153 to Wesley). Depending upon the application, the energy levels (e.g., joules) of the pulsar are specified along with the necessary frequency (e.g., pulses/second). The electronics of the pulsar are then designed and constructed according to the required specification. The physical configuration of the pulsar, and the apparatus for delivering the pulses, is also tailored to the particular configuration and requirements of the system.

Figure 3A:
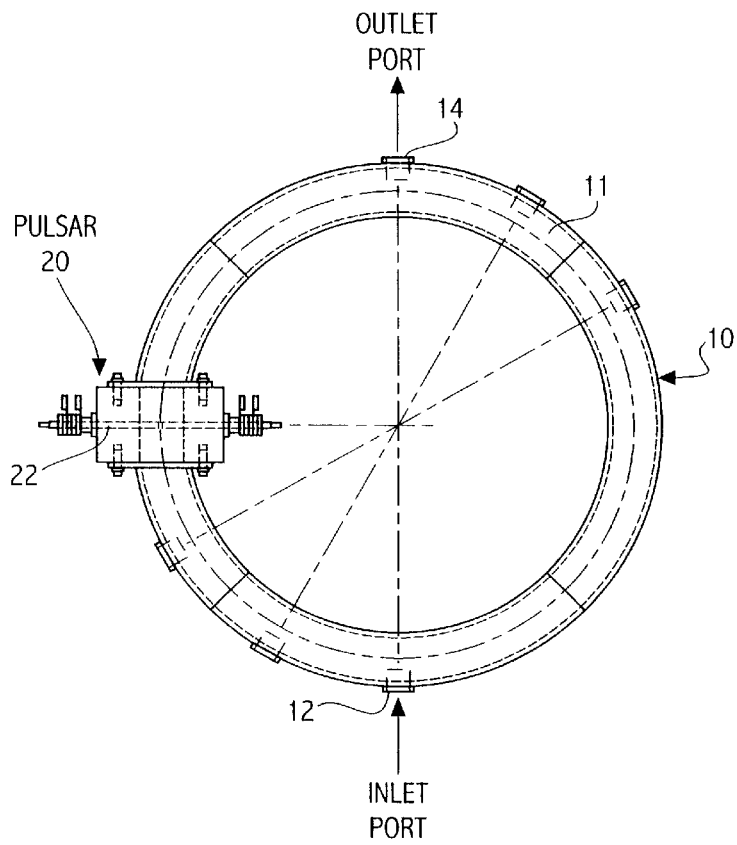
FIG. 3A is a side view of a reactor embodiment of the present invention showing placement of portions of a pulsar used to deliver the electrical pulses to the polymer or polymer solution.
Figure 3B:
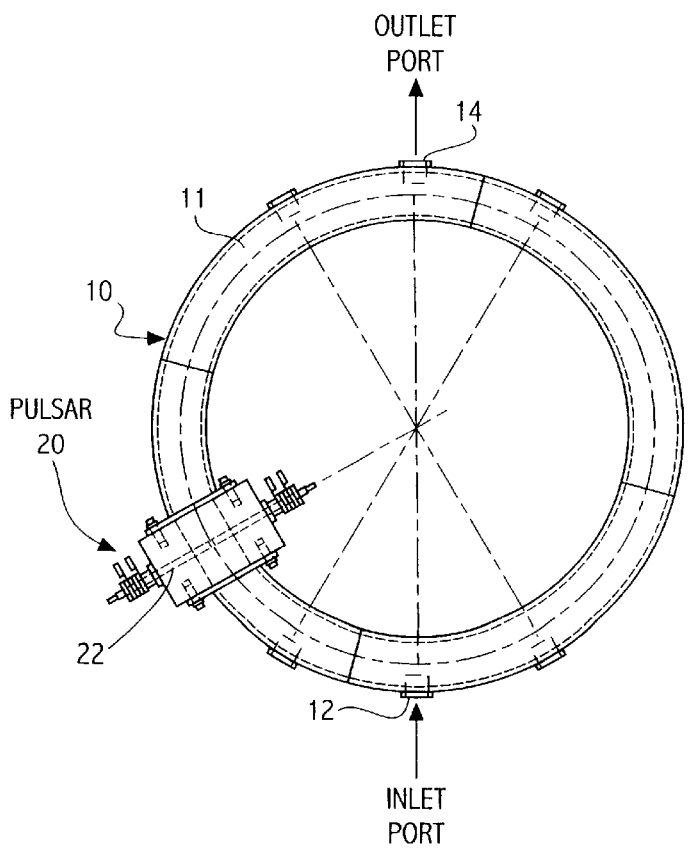
FIG. 3B is a side view of the reactor of FIG. 3A with the pulsar located at a different portion of the reactor.

An improved reactor of the present invention, and particularly as it relates to polymer activation for wastewater treatment applications, is shown generally as 10 in FIGS. 3–4. It will be understood by those of ordinary skill in the art that the doughnut-shaped or toroidal reactor 10 of the present invention, hereinafter referred to as a torus reactor, may be used in any application where the activation of polymers and polymer solutions is required.

The reactor of the present invention includes a chamber 11, a polymer solution inlet 12 and a polymer solution outlet 14. Associated piping and valving and the like are also provided (not shown). The reactor 10 of the present invention also accommodates at least that portion of the pulsar (shown generally as 20), such as the electrodes 22 and the like, which delivers the electrical energy to the polymer solution contained within the reactor chamber 11. The reactor 10 of the present invention may also serve to mix the polymer (and eliminate the mixing step, such as at point B of FIG. 1B).

A preferred embodiment of a reactor chamber 11 of the present invention is a torus reactor having a toroidal or doughnut-shaped chamber 11. Tests have shown that because of the particular shape of the torus chamber 11, the pressure waves imparted by the pulsar 20 to the solution in the chamber propagates around the reactor chamber 11 in a confined fashion relative to reactor chambers having other configurations. The relative confinement as a result of the doughnut-shaped chamber reduces the attenuation of the shockwaves, which reduces the dissipation of the energy imparted by the shockwaves. Thus, more efficient activation of the polymer solution is achieved.

In its preferred form, the torus reactor 10 is oriented vertically as shown in FIGS. 3A, 3B, 4A and 4B. Moreover, tests have shown that for maximum efficiency in polymer activation, the polymer solution should be sucked or pulled through the reactor, based on a pressure differential between the inlet and outlet of the reactor, by a pump or other known means. This is best enabled by the vertical orientation as well as a particular inlet and outlet port location. Specifically, in the preferred form, the polymer solution inlet 12 is located on the bottom of doughnut-shaped chamber 11. Also in its preferred form, the polymer solution outlet 14 is located on the top of the reactor chamber 11. In this manner, the polymer solution may be fed to the bottom of the reactor chamber 11 and pulled through the top of the reactor.

More particularly, by taking away the activated polymer solution from the top of the reactor chamber, by pumping or other means, and feeding said solution to the reactor chamber 11 through the bottom, a pressure differential is created and the solution pulled through the chamber. It will be understood by those of skill in the art that while the preferred embodiment of the torus reactor is as described, it is not necessary to process the solution in this manner. For example, the inlet 12 and outlet 14 ports may be located at other points along the reactor chamber's 11 circumference. In addition, if reactor chambers of other shapes are employed, the inlet and outlet ports, as well as the placement of the pulsar, should be designed and located to achieve maximum polymer activation for the desired use.

The pulsar 20, or at least the portion of the pulsar that delivers the electrical pulses such as the electrodes 22, is attached to the reactor chamber 11 at a location designed to maximize shockwave propagation and minimize attenuation. In its preferred form, the pulsar 20 is attached to the torus reactor chamber midway between the solution inlet and outlet ports as shown, for example, in FIG. 3A. As will be understood by those of skill in the art, and depending upon the application, the pulsar may be located at other areas along the circumference of the torus reactor chamber as shown, for example, in FIG. 3B.

Figure 4A:
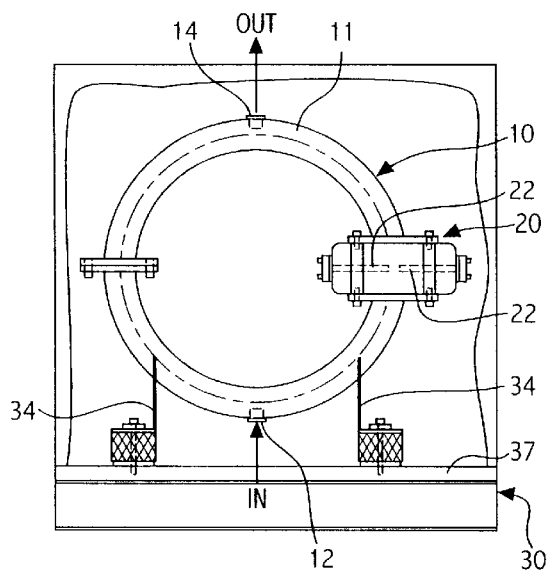
FIG. 4A is a side view of an embodiment of a reactor and pulsar configurations of the present invention.
Figure 4B:
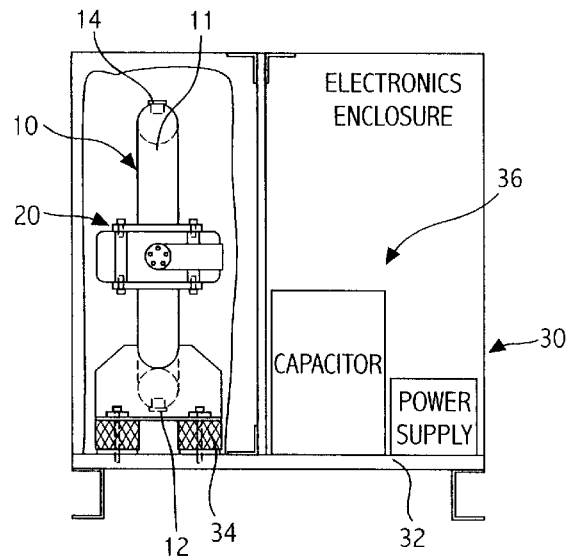
FIG. 4B is a front side view of the embodiment of the present invention shown in FIG. 4A.
Figure 4C:
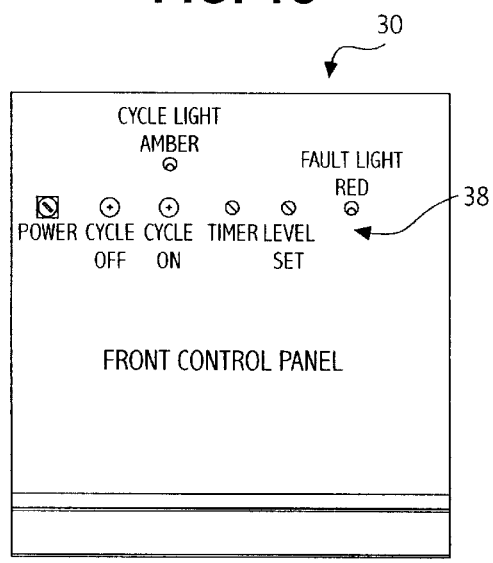
FIG. 4C is a schematic diagram of a typical control panel for operation of the embodiment of the present invention shown in FIGS. 4A and 4B.

An embodiment of an assembly of the present invention is shown in FIGS. 4A, 42 and 4C. The torus reactor 10, which is oriented and configured as described, is contained in a housing 30. It may be affixed to a base 32 by brackets 34, or other well known means. The electronics 36 of the pulsar 20 may then be contained within housing 30. The pulsar 20 is operably connected to the reactor chamber 11. A control panel 38 may also be provided on, as part of or remote from the housing 30 that is used to operate the devices. The apparatus of the present invention, however, may be configured in a variety of ways, as will be understood by those of skill in the art, depending upon the particular application.

Activation tests conducted using a preferred embodiment of the present invention, using a torus reactor 10 and pulsar supplied by PPTI, have revealed that polymer solutions achieve better polymer charge density than polymers activated in conventional ways, almost irrespective of the frequency or energy of the pulses. Moreover, application of the present inventions results in more rapid activation, which reduces or eliminates aging of the activated polymer solution. This results in less polymer usage, less energy usage and process simplification through the potential elimination of the mixing and/or aging steps.

Figure 5:
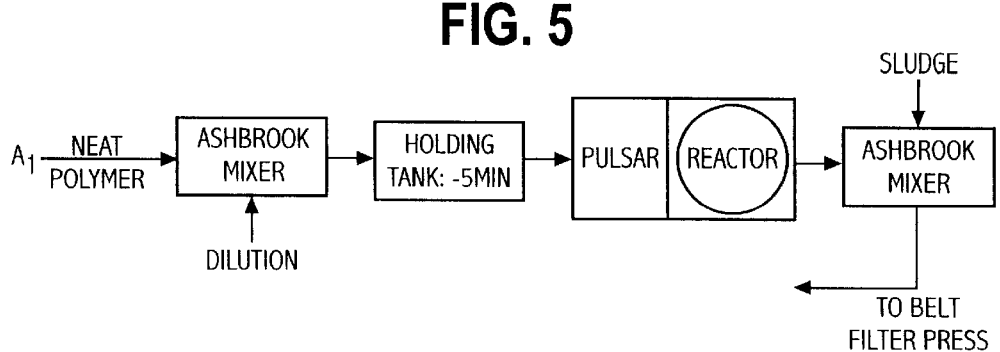
FIG. 5 is a schematic drawing of a system of the present invention as applied to a typical biosolid dewatering process.

The savings and efficiencies available from use of the present inventions are substantial. FIG. 5 schematically shows the present invention as applied to the dewatering of biosolids. There, the bulk or neat polymer is mixed with dilution water in a mixing tank. The polymer solution is then transferred to the torus reactor and subjected to the electrical pulses for activation. Once activated, the solution is pulled through the reactor chamber by a pump and mixed with the biosolids to be dewatered. Through use of the inventions, and depending upon the particular application, it may not be necessary to age and further mix the polymer solution before or after activation. This simplifies the dewatering process, reduces the necessary hardware and physical space required, and is more consistent and effective. And, use of the pulsar achieves better activation with substantially lower energy costs.

Notably, tests have also shown that increased polymer activation using low energy and low frequency electrical pulses may be achieved with energy consumption being comparable to a 150 watt light bulb. Preliminary tests have revealed that regardless of the pulse energy or frequency used, increased activation over known methods is consistently achieved. More particularly, polymer solutions have been pulsed with 200–1000 joules/pulse energy levels with a frequency of only 1 pulse every 5–15 seconds. These tests have shown, in the context of biosolid dewatering, the present inventions can maintain conventional cake solid percentage levels (e.g., 20%) by using 10%–25% less polymer and negligible energy. Alternatively, cake solid levels may be improved, with slightly decreased savings of polymer used. Regardless of the actual application, however, the present inventions achieve optimum polymer activation that lowers the amount of polymer required and uses substantially less energy.

It will be understood by those of skill in the art that the present inventions may be used in a wide variety of applications with a wide variety of configurations. Thus, while preferred embodiments and methods have been illustrated and described, it will be understood by those of ordinary skill in the art that changes and other modifications can be made without departing from the invention in its broader aspects. Various features of the present invention are set forth in the following claims.

What is claimed is:

1. A method for activating a polymer comprising:

mixing said polymer with water to form a solution;

introducing said solution into a confined reactor vessel;

subjecting said solution to shockwaves created by means of electrical pulses applied at a low frequency and at energy levels of between 200 to about 1000 joules per pulse inside said confined reactor vessel, wherein the charge density of said polymer is increased; and discharging said solution from said confined reactor vessel.

2. The method of claim 1 wherein said electrical pulses are applied at a frequency of between about one pulse per five seconds to about one pulse per second.

3. The method of claim 1 wherein said electrical pulses are low-energy pulses.

4. The method of claim 1 wherein said steps of introducing said solution into said confined reactor vessel and discharging said solution from said confined reactor vessel are carried out continuously.

5. A method for treating wastewater comprising:

mixing a polymer with water to form a solution;

introducing said solution and said wastewater into a reactor vessel;

subjecting said solution and said wastewater to shockwaves created by means of electrical impulses applied at a low frequency and at energy levels of between 200 to about 1000 joules per pulse inside said reactor vessel, wherein the charge density of said polymer is increased and said wastewater is treated; and discharging said solution and said wastewater from said reactor vessel.

6. The method of claim 5 wherein said electrical pulses are applied at a frequency of between about one pulse per five seconds to about one pulse per second.

7. The method of claim 5 wherein said electrical pulses are low-energy pulses.

8. The method of claim 5 wherein said steps of introducing said solution and said wastewater into said reactor vessel and discharging said solution and said wastewater from said confined reactor vessel are carried out continuously.

9. A method for treating wastewater comprising:

mixing a polymer with water to form a solution;

introducing said solution into a reactor;

subjecting said solution to shockwaves created by means of electrical impulses applied at a low frequency and at energy levels of between 200 to about 1000 joules per pulse in said reactor to increase the charge density of said polymer;

discharging said solution from said reactor; and combining said discharged solution with wastewater to be treated.

10. A method for activating a polymer comprising:

mixing said polymer with water to form a solution;

introducing said solution into a confined torus shaped reactor vessel;

subjecting said solution to shockwaves created by electrical pulses applied at a low frequency and at energy levels of between 200 to about 1000 joules per pulse inside said confined reactor vessel, wherein the charge density of said polymer is increased; and discharging said solution from said confined reactor vessel.

11. The method of claim 10 wherein sa-id electrical pulses are applied at a frequency of between about one pulse per five seconds to about one pulse per second.

12. The method of claim 10 wherein said electrical pulses are low-energy pulses.

13. The method of claim 10 wherein said steps of introducing said solution into said confined reactor vessel and discharging said solution from said confined reactor vessel are carried out continuously.

14. A method for treating wastewater comprising:

mixing a polymer with water to form a solution;

introducing said solution and said wastewater into a torus shaped reactor vessel;

subjecting said solution and said wastewater to shockwaves created by electrical impulses applied at a low frequency and at energy levels of between 200 to about 1000 joules per pulse inside said reactor vessel, wherein the charge density of said polymer is increased and said wastewater is treated; and discharging said solution and said wastewater from said reactor vessel.

15. The method of claim 14 wherein said electrical pulses are applied at a frequency of between about one pulse per five seconds to about one pulse per second.

16. The method of claim 14 wherein said electrical pulses are low-energy pulses.

17. The method of claim 14 wherein said steps of introducing said solution and said wastewater into said reactor vessel and discharging said solution and said wastewater from said confined reactor vessel are carried out continuously.

18. A method for treating wastewater comprising:

mixing a polymer with water to form a solution;

introducing said solution into a torus shaped reactor;

subjecting said solution to shockwaves created by electrical impulses applied at a low frequency and at energy levels of between 200 to about 1000 joules per pulse in said reactor to increase the charge density of said polymer;

discharging said solution from said reactor; and combining said discharged solution with wastewater to be treated.

* * * * *